INVENTOR.
THOMAS D. VERTIN
BY
Donnelly, Montag + Harrington
ATTORNEYS

INVENTOR.
THOMAS D. VERTIN
BY
Donnelly, Mentag, + Harrington
ATTORNEYS

INVENTOR.
THOMAS D. VERTIN
BY
Donnelly, Mentag + Harrington
ATTORNEYS

Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 8

INVENTOR.
THOMAS D VERTIN
BY
Donnelly, Mentag + Harrington
ATTORNEYS

INVENTOR.
THOMAS D. VERTIN
BY Donnelly, Mentag + Harrington
ATTORNEYS

Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 11

INVENTOR.
THOMAS D. VERTIN
BY
Donnelly, Mentag & Harrington
ATTORNEYS

Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 12

INVENTOR.
THOMAS D. VERTIN
BY
Donnelly, Mentag + Harrington
ATTORNEYS

Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 13

INVENTOR.
THOMAS D. VERTIN
BY
Donnelly, Mentag + Harrington
ATTORNEYS

Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 14

INVENTOR.
THOMAS D. VERTIN
BY
Donnelly, Mentag + Harrington
ATTORNEYS

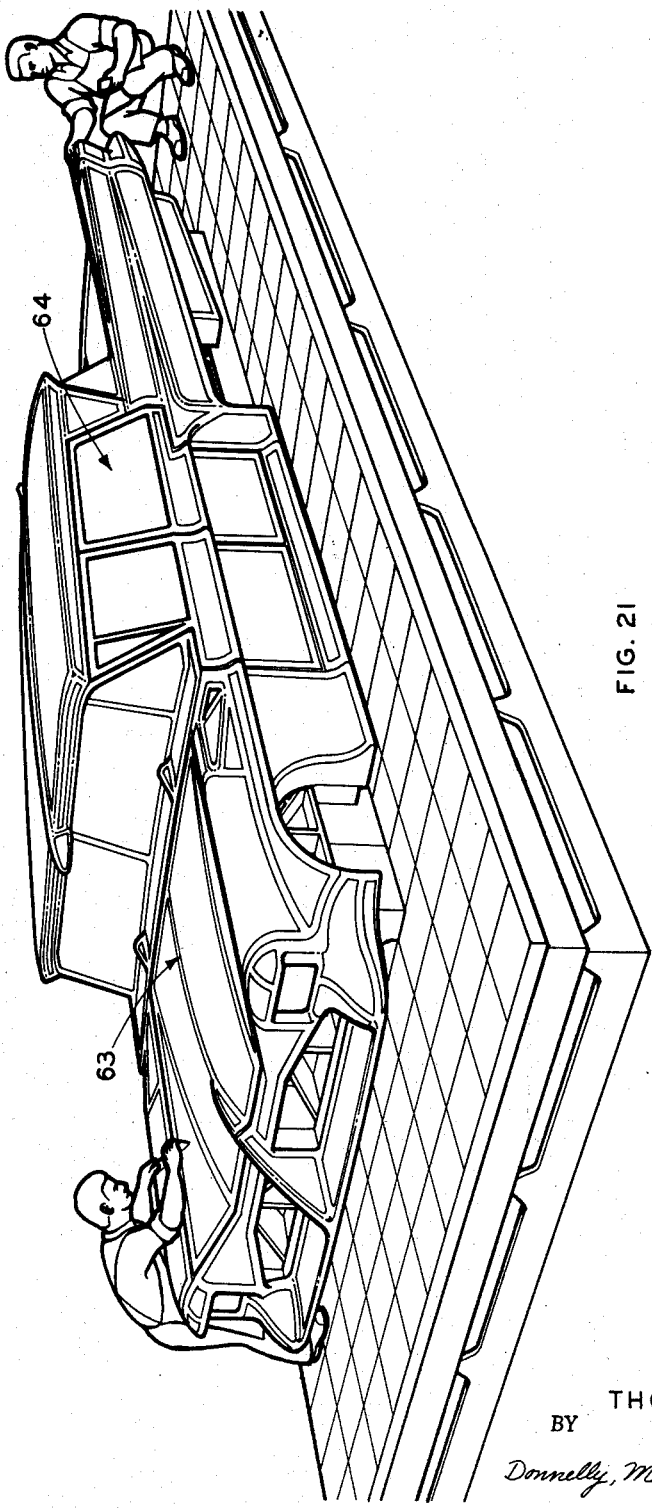

Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 16

INVENTOR.
THOMAS D. VERTIN
BY
Donnelly, Mentag + Huntington
ATTORNEYS

INVENTOR.
THOMAS D. VERTIN

INVENTOR.
THOMAS D. VERTIN
BY
Donnelly, Mentag + Harrington
ATTORNEYS

Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 19
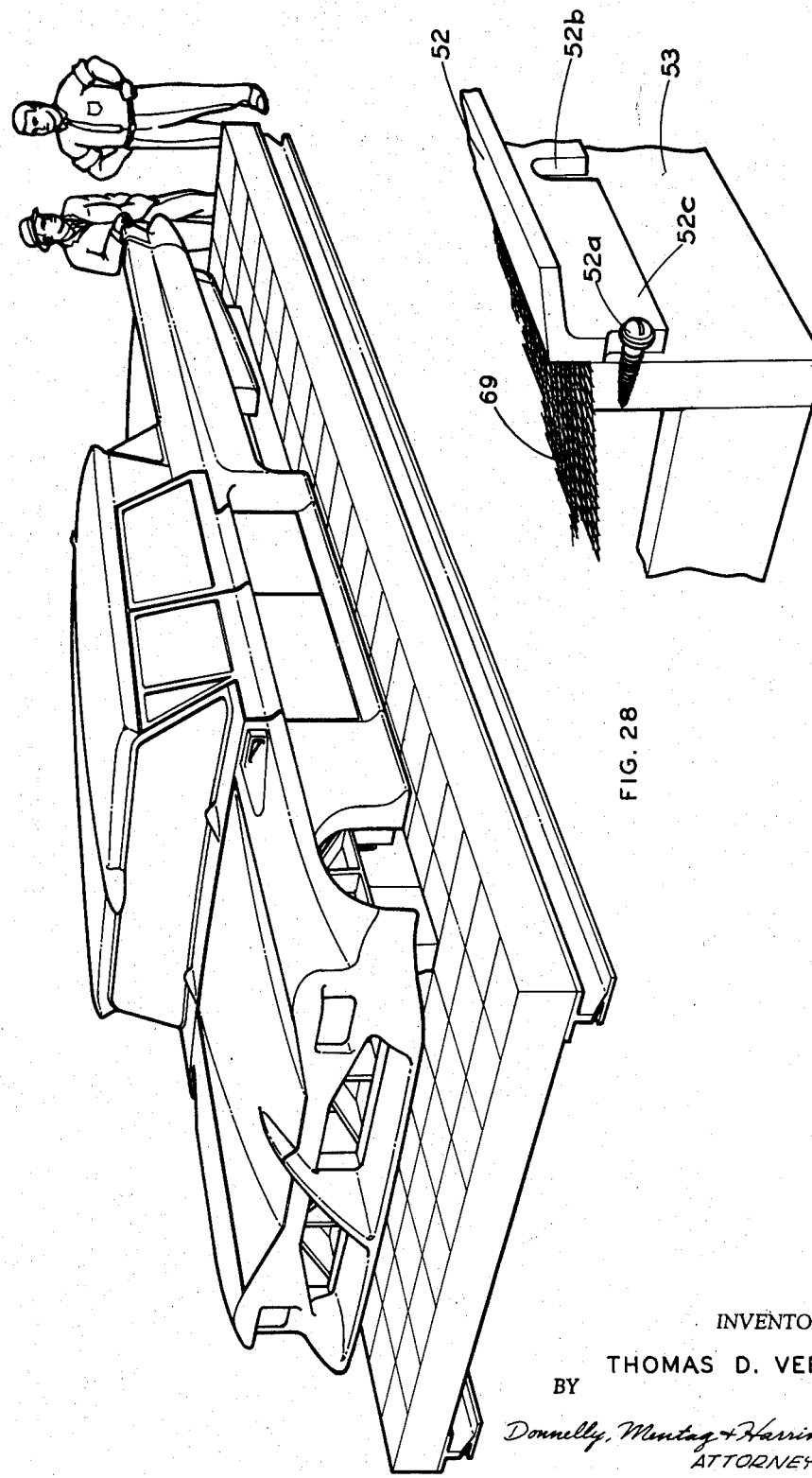
INVENTOR.
THOMAS D. VERTIN
BY
Donnelly, Mentag & Harrington
ATTORNEYS Feb. 5, 1963 T. D. VERTIN 3,076,231
METHOD AND MEANS OF BODY DEVELOPMENT PROCEDURES
AND THE MAKING OF MASTER MODELS
Filed March 31, 1959 20 Sheets-Sheet 20

INVENTOR.
THOMAS D. VERTIN
BY
Donnelly, Mentag + Harrington
ATTORNEYS

United States Patent Office 3,076,231
Patented Feb. 5, 1963

3,076,231
METHOD AND MEANS OF BODY DEVELOPMENT PROCEDURES AND THE MAKING OF MASTER MODELS
Thomas D. Vertin, 37540 Lake Shore Drive, Mount Clemens, Mich.
Filed Mar. 31, 1959, Ser. No. 803,240
7 Claims. (Cl. 18—47.5)

This invention relates generally to the art of model making, and, more particularly, to a novel and improved method of body development engineering and means of making models for the automobile industry and like industries for use in tooling up for major and minor model changeovers, mock-ups and like purposes.

It is the primary object of the present invention to provide improved procedures for reducing the time cycle required to make master models of a new design for use in coordinating the manufacture of dies, tools and checking fixtures which are needed for the new product having the new design. Experience has shown that the costs of tooling for new products can be greatly reduced by employing the procedures embodied in the present invention. It will be seen that the invention is well adapted for use in the auto industry, but it will be understood that it is not intended that the invention be restricted to such industry since it can be used in any industry where it has utility. The procedures of the present invention can be used in the manufacture of any article having a formed body, housing or the like in which the separate parts thereof are made by forming, stamping, drawing, molding or like methods.

Heretofore, in the automotive industry, it has been common practice when producing a major or new body style to go through many preliminary time-consuming and costly steps in development engineering before a master model could be produced. This procedure has required an approximate time period of at least seven months. In sequence, after the styling illustrations are found acceptable, the shape or form is produced in miniature scale and the full-scale feasibility and styling clay model is shaped to size with prove out. From this the body surface layout draft is produced thus enabling the body designers to make a full set of drawinngs showing the complete surface and details of body construction. These drawings are needed to make product body drafts and templates from which a master model is made. In comparison, it is an important object of this invention to provide modeling and intermediate body development phases or procedures which will materially reduce the time cycle required by the other prior art modeling procedures from seven months to three months. During the three-month span required, experience has proved that this invention can produce all of the necessary procedures required, eliminating unnecessary ones to obtain better coordinated master models of high dimensional accuracy. In addition, all necessary drawings, master templates, body drafts and a female master model will be complete to facilitate production of manufacturing dies and tooling at a much earlier date than is possible with the similar prior art procedures. With the coordination of this invention incorporated in subsequent tooling, many production problems that have been common in the past in all phases of manufacture will be eliminated; thus enormous savings in a major or minor model change can be realized.

It is an important object of this invention to provide a novel modeling procedure that permits the fabrication of master models simultaneously with the operations of styling, body development engineering and body structures engineering. This feature is not possible in prior art modeling procedures as work on the models cannot be initiated in said prior art procedures until all of the aforementioned operations are completed. The simultaneous phasing of the model making operations of this invention is made possible by means of the novel intermediate male pattern which is accurately made in accordance with the three dimensional clay styling model.

Phase one of the body surface development and the making of master models in accordance with this invention is started while the basic form of the vehicle on the styling clay is only half completed. In this way, it is possible to start construction at a much earlier date than was common in the prior art procedures thus expediting the time required to change from one major or minor model change-over to the subsequent one.

It is the object of phase two of this invention to provide an improved modeling procedure which embodies a novel supporting sub-structure for retaining the various body panel peripheries, high line, and character lines in their relative positions. The construction of the sub-structure can be started and built up prior to the time that the 100 percent, full-size styling clay model is completed. Again, this diminishes the time cycle of the overall program, whereas the base of models of prior art procedures were never before mounted on the basic supporting cube at this stage of the body surface development program.

Phase three of this invention encompasses the fabrication of contoured periphery lines for each individual panel taken from the female mold off the 100 percent styled clay model. This procedure of the invention is novel in that all peripheries, highline and character lines of all panels are established from a female impression of the clay model. In prior art procedures, this procedure is not employed. In addition, on a comparative time basis, they have not started any phase of their modeling at this time. In this invention, phase three is already working in three dimensional planes; whereas the prior art procedures cannot begin to take advantage of this feature until a much later date.

It is a further object of phase four of this invention to provide an intermediate master male pattern having all periphery, highline, and character lines adjustable from the beginning stages of this invention to the completion stages. Phase four takes full advantage of the flexible materials employed for this purpose in the fabrication so that the peripheral band surfaces of the patterns are independent of the sub-structure until the final stages, thus offering opportunity for engineering changes during process. It is still a further object of phase four of this invention to accurately balance the periphery, highline, and character lines, without engineering information, within tooling tolerances simultaneously in three planes so that the body is symmetrical. This is achieved through the adjustability of the periphery and character lines. Appearance and style are the prime considerations of automobile styling rather than function, whereas this would not be true in aircraft manufacture where all surfaces are functional because of aerodynamic factors. To work to engineering information, as in aircraft manufacture, this invention provides a master male pattern having a peripheral band made of a flexible plastic type material which is adjustable to suit the shape of the product in as many planes as is necessary with provisions for working in three planes. This work is established with the aid of engineering information. Example: An airfoil surface in aircraft, missile or rocket manufacture, such as a rocket nose cone assembly.

It is still another object of this invention to provide a modeling procedure for producing master models or patterns having a novel sub-structure which can be engineered so that all features of the models can be utilized over again except for unique, new or modified surface changes such as face lifts, and major or minor changes.

This provides an enormous cost savings in coordination of tooling and master model making which was heretofore unobtainable in prior modeling methods.

Contrary to engineering practice in the prior art procedures, at this stage of surface development, phase five of this invention provides the advantage of checking clearances, position and opening or closing features of the aforementioned panels. This is not practical at this time or at a later time in modeling procedures of the prior arts because of bulk, weight and accessibility. In addition, the periphery, highline and character lines of all other panels are checked at this time while all contours of the complete body are matched. This has not been a possible practice in the prior art modeling procedures to check panels thusly without the normal surface incorporated on the intermediate patterns. Heretofore, they have had to wait until the final stages of operation when a complete normal surface has been developed to perform this inspection process.

It is a further object of phase six of this invention to establish engineering information which will provide the body structures engineering department with actual dimensions to work to in the making of their product drawings. All dimensions pertaining to this phase are taken from the intermediate panels which are located on surface plates so that conventional precision instruments may be used to measure and record all pertinent information. This phase six of the invention is novel because engineering information is supplied with a greater degree of accuracy and at a point earlier in the time cycle of the overall program than was heretofore possible.

It is a further object of phase seven of this invention to introduce a quick, novel method of filling the normal surface of the intermediate male pattern with a pliable material, such as dental-wax or plastic type material so that the body surface will be duplicated by using the female mold of phase three as a base. This is achieved by pouring the pliable material through the back of the intermediate male pattern onto the female mold. In the prior art procedures, a pliable material has not been used thusly for this operation.

It is still another object of phase eight of this invention to provide an improved modeling procedure which eliminates much of the hand work required for normal surface development when making mahogany models and the like, and which is simple, easy, efficient and accurate in practice, because of the pliable material used for the normal surface, whereby minor styling or engineering changes can be incorporated sooner and more readily with this invention. Again at a comparative time stage, phase eight is working in three planes while the prior art procedures have just begun work on two planes. During this phase, the reference templates of this invention are used for surfacing the normal or outer surfaces in relation to periphery, highline and character lines.

It is another object of phase nine of the body surface development of this invention to provide a modeling procedure wherein the 100 percent styling clay model prove-out stage employed in most prior art procedures can be eliminated. This deletion of the prove-out operation is achieved through the assembly on the basic supporting cube of the various master male patterns which are filled in the normal surfaces with a pliable dental wax or plastic type material that offers highlighting of the assembled body with integral surfaces and no joints exposed. At this time, management and the styling department can review the assembled cubed panels for prove-out and fit-up determinations as well as for giving final approval to the overall design or style. In addition, changes may also be incorporated more readily at this time with savings in time and money which would not be possible by the use of prior art modeling procedures. Again, this phase of the invention eliminates two plane engineering of the prior art procedures because the complete body is established in three planes.

It is a further object of phase ten of this invention to provide an improved modeling procedure for automotive model making and the like by means of which an accurately molded female master model is produced during this phase and from which as many master male model duplications can be made as is desired. The master male model duplications and the female master model are made of the same materials and general construction so that they have a uniform effect when subjected to any atmospheric conditions. In that way, all contractive or expansive movements are the same as between male master models and the master female model or mold, thus offering uniform dimensional stability.

It is a further object of phase eleven of the body surface development of this invention to provide duplicate master male models from the master female model, and at this time they are checked to the master templates and other established information. These duplicate master male models would be used for die manufacturing, body assembly manufacturing, for the manufacture of checking fixtures, and subsequent tooling. This automatically provides additional lead time as all phases of tooling are started simultaneously.

It is a further object of phase twelve of the body surface development of this invention to remove the pliable material from the inner normal surface areas of the intermediate male patterns used for the complete body in preparation for their return to the styling department. This is a new practice which is another feature of this invention. With this innovation, styling now has a cubed-up, basic model ready for subsequent major or minor model changes to be incorporated. This feature allows the stylist to utilize all sub-structures, and perhaps certain panels, over again immediately in his next program. Time and ultimate costs are greatly reduced because of coordination from the previous program with this feature which heretofore has not been practiced in prior art procedures.

It is another object of this invention to provide a modeling procedure wherein an organization that goes from major to minor changes in a subsequent program will not necessarily need the process mentioned in phase eleven where duplicate master models are used. Instead, an alternate phase 11a could be followed wherein the original set of intermediate male panel patterns could be filled in on the normal surfaces of the panels with a permanent plastic-type material for use as checked out master male models. This would also be a good application for low production activities where major model changes are not generated for that program or on a yearly basis.

It is a further object of the present invention to provide a modeling procedure by means of which one-half of a symmetrical model can be developed and the other half thereof can be built from dimensional information obtained therefrom.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 21 shows the assembly of completed intermediate panel patterns mounted on the basic supporting cube structure and being given the final touches for complete form as desired by styling and management;

FIG. 28 is a perspective view of the finally approved panel master models with the surface permanently completed and re-assembled on the basic supporting cube structure to provide the male master models for die manufacture and subsequent tooling;

FIG. 29 is a sectional view of the intermediate male pattern without the normal surface.

Figure 1:
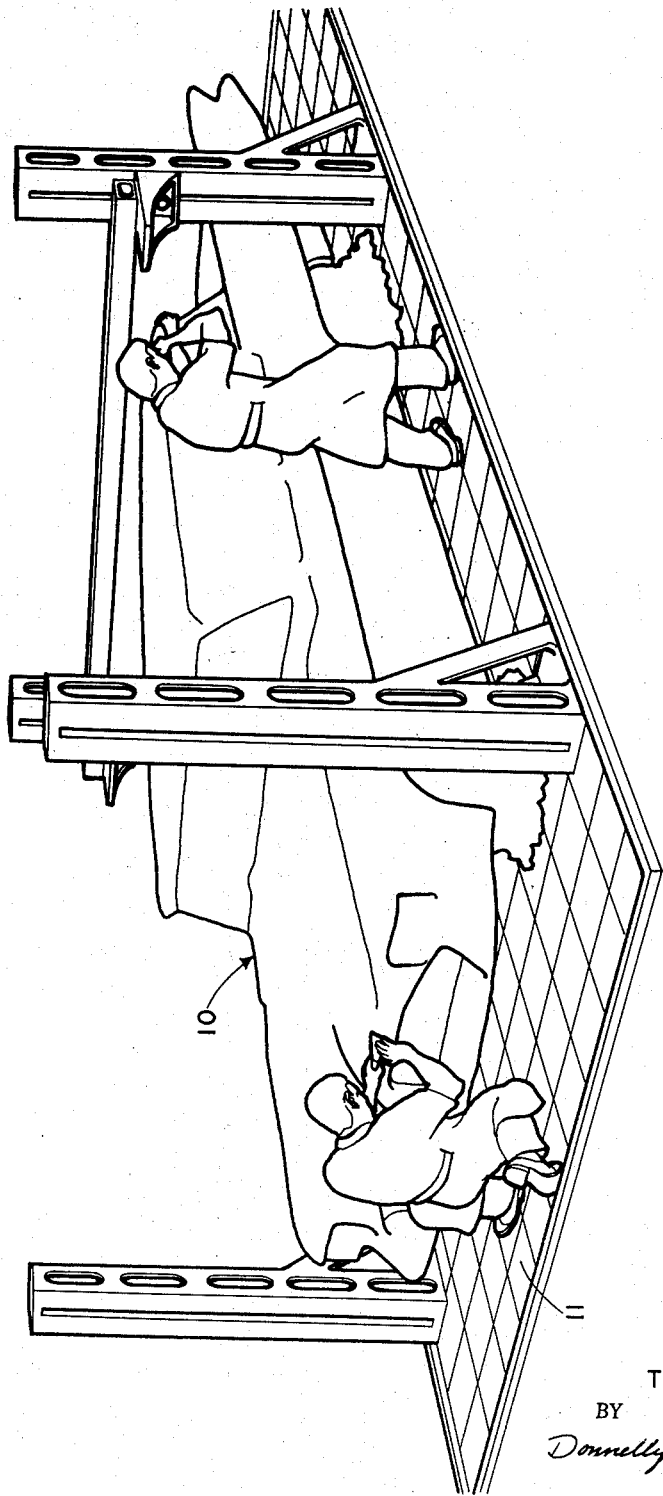
FIG. 1 is a perspective view of a full size scale clay styling model with the basic form of the vehicle being approximately 50% established or finished.

For a detailed description of the invention reference is now had to the accompanying drawings (FIG. 1) wherein the numeral 10 generally indicates a conventional styling model being made from clay and to a full size scale reproduction of a desired automobile body. Although clay is normally used in such instances, it will be understood that any suitable pliable material could be used for making the full size model. The styling model 10 is made on a surface plate 11 and the clay is shaped in accordance with the styling sketches or drawings of the desired new style, by means of the usual hand methods. As shown in FIG. 1, the styling model 10 is approximately half finished, that is, the clay has been worked so that the overall size of the automobile is well established. In other words, the shaping of the clay has been approximately 50% completed so as to establish the basic form of the automobile body.

Figure 2:
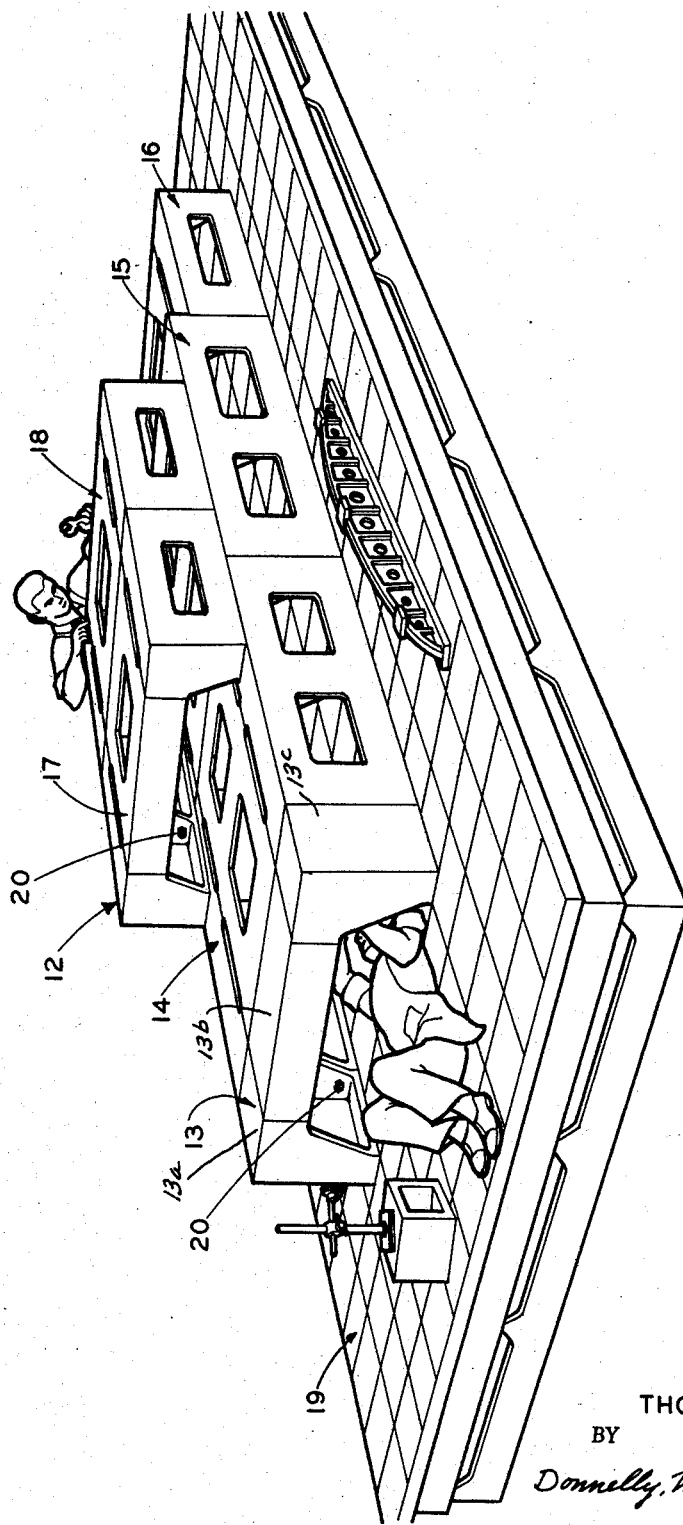
FIG. 2 is a perspective view of a basic supporting cube structure assembled, located and fixed on a surface plate.

According to the present invention when the work on the styling model has reached the point where the basic form of the car body is established by the body styling department, the first phase or step toward developing the body surface is taken. The first phase of the body surface development comprises the establishment and the assembling of the basic supporting cube on a surface plate. As shown in FIG. 2, the basic cube is generally indicated by the numeral 12 and functions as a basic supporting structure for the individual panel patterns which will form the complete body model. The basic cube 12 is preferably made from a plurality of rectangularly shaped hollow blocks including the lower layers of blocks 13, 14, 15 and 16 and the upper centrally disposed blocks 17 and 18. The upper layer of blocks 17 and 18 is obviously disposed in a position approximating the passenger compartment of the car. The rear block 16 of the lower layer is made of a less depth than blocks 13, 14 and 15, and covers the trunk area. The blocks 13, 14, 15 and 16 may be fixedly secured to the surface plate 19 by any suitable means. The blocks forming the basic cube 12 may be made from a lightweight metal as aluminum, plastic, or like materials;

and they are secured together by any suitable means as by bolts and nuts generally indicated by the numerals 20. The height and length of the various blocks would be determined by the basic form of the clay model of FIG. 1, and they would be made to a size to allow for the thickness of the various pattern panels which will be supported thereon, as more fully described hereinafter. Each of the aforementioned cube blocks comprises a pair of outer or side portions as 13a and 13c which are fixedly interconnected by the center portion 13b. It will be seen that by merely changing the center portion 13b in subsequent models, the basic supporting cube could be used again and again.

Figure 3:
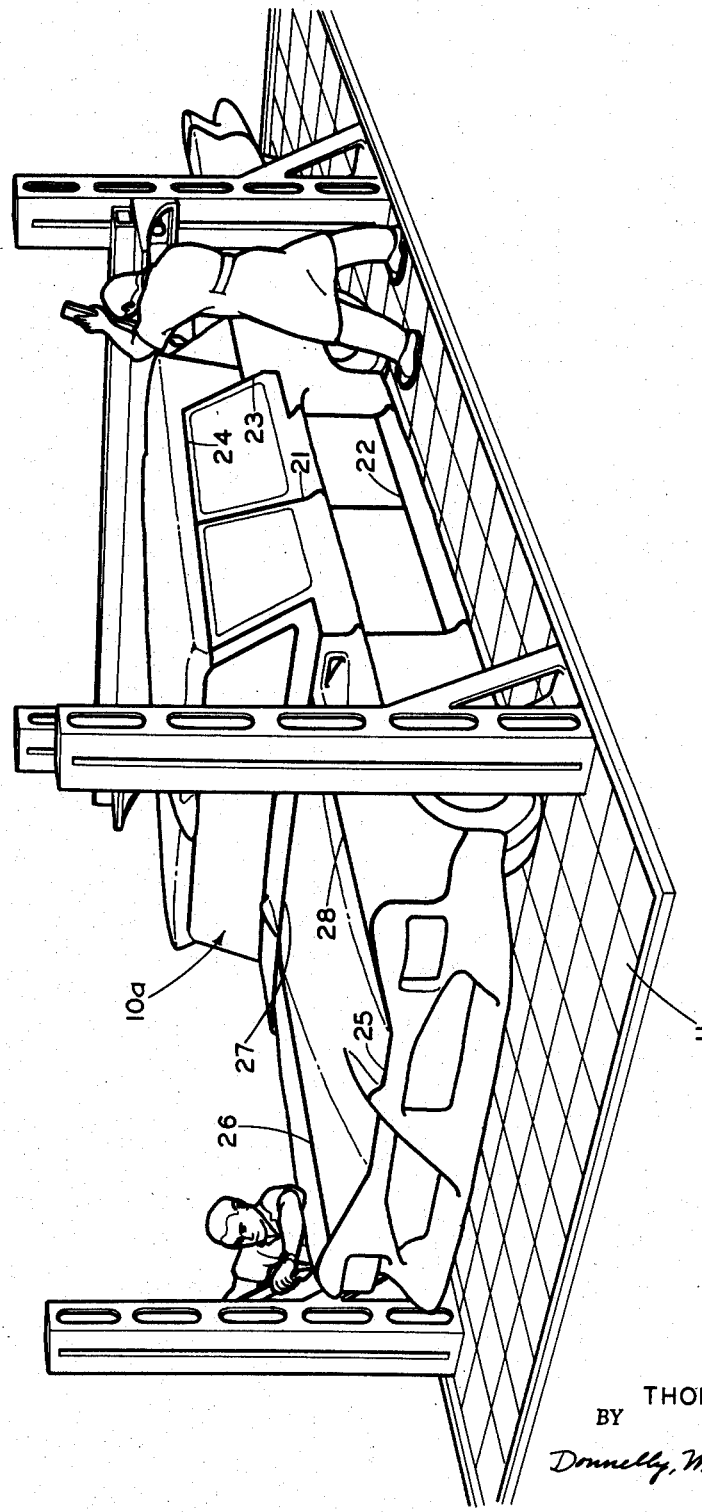
FIG. 3 is a perspective view of the full size clay styling model shown in FIG. 1, showing the clay model at the 75% completion stage with the panel peripheries being established.

During the time that the body surface development department has been making the aforedescribed basic supporting cube 12 the body styling department has continued to shape the full size scale syling clay model and when the clay model is approximately 75% completed the panel peripheries will be established as shown in FIG. 3 by the clay model 10a. For example, the periphery of the left rear door panel would be bounded by the opening lines 21, 22, 23 and 24, and, the periphery of the hood panel would be bounded by the opening lines 25, 26, 27 and 28. It will be seen that the various skin panels of the car body are marked off by the aforementioned opening lines which are scored into the clay surface of the model 10a, and phase two of the body styling procedure will be finished.

Figure 4:
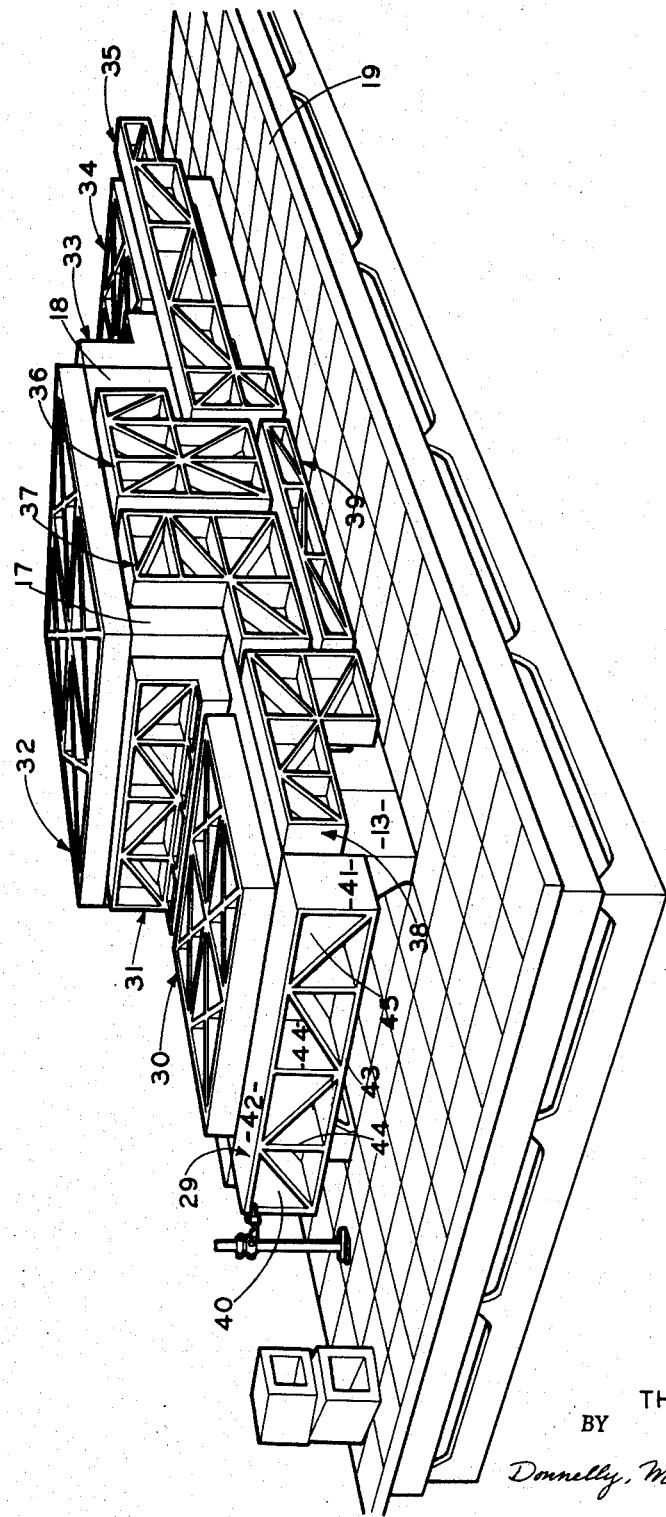
FIG. 4 is a perspective view of the basic supporting cube structure shown in FIG. 2, showing the insert substructure fabricated and located thereon for supporting the various panels of the automobile body.

When the clay styling dummy or model 10a stage is reached by the body styling department the body surface development department can then proceed with the second phase or step of the body surface development as illustrated in FIG. 4. This second body surface development phase comprises the fabricating and locating of the insert substructures which will support or carry the various body pattern panels. These insert substructures are indicated in FIG. 4 by the numerals 29 through 39, which are adapted to support the complete set of body panels, including the following: the grill, hood, windshield, roof, back light, rear deck, rear left quarter panel or fender, rear left door, front left door, front left fender and left side panels, respectively. These panel insert substructures would be shaped in accordance with the general basic form of the clay model 10a and the panels mounted thereon. The insert substructures are box shaped with an open top and bottom, that is, they would have side walls and a supporting structure to suit the periphery of the panel. For example, the substructure insert 29 comprises the end walls 40 and 41, the upper and lower walls 42 and 43, the vertical stiffening walls or standards 44, and the diagonal inter-connecting walls 45. The insert substructures may be made of wood, as plywood or plastic tubing sections or any other suitable materials and are releasably located in place on the basic supporting cube by any suitable means, as by being screwed and doweled onto the basic supporting cube 12.

Figure 5:
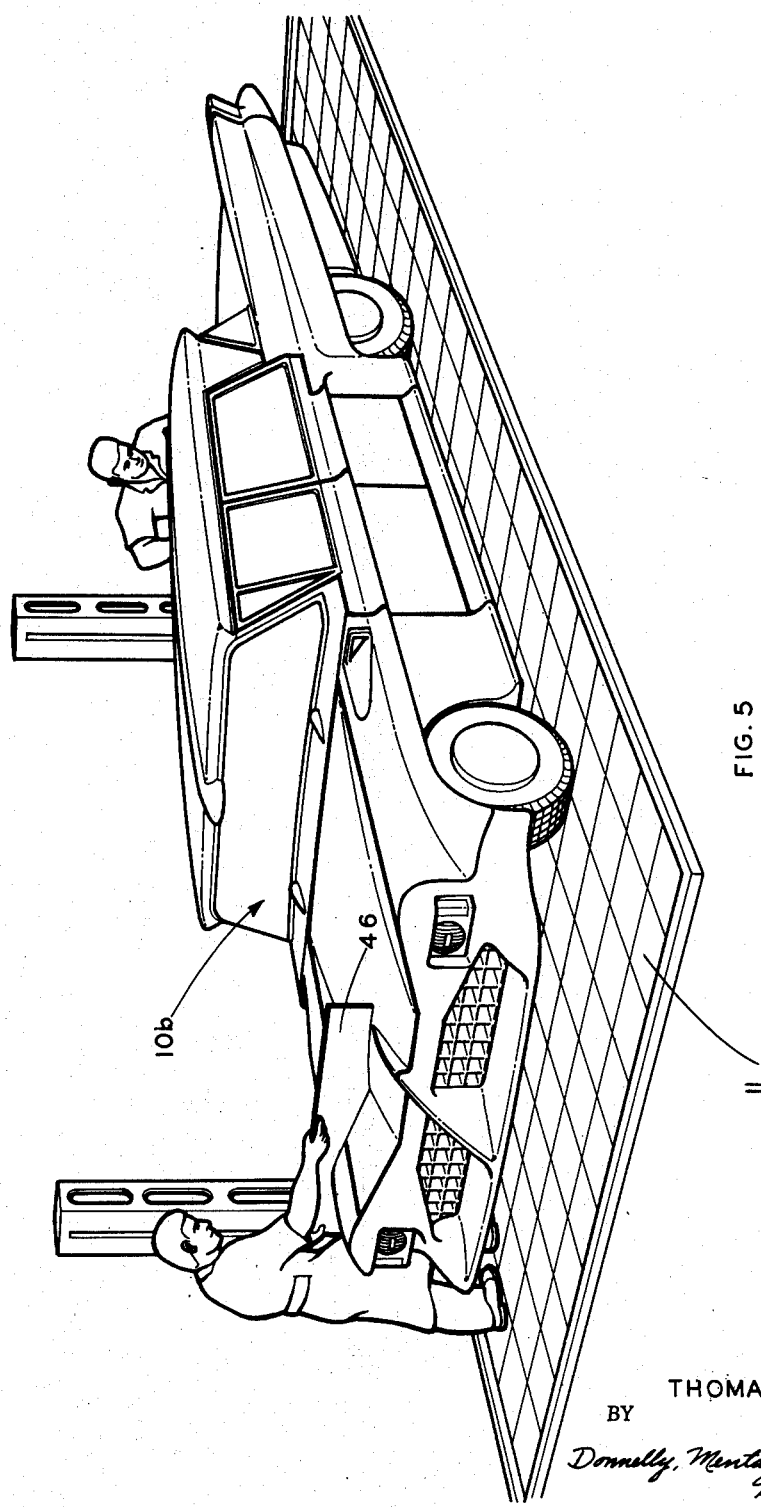
FIG. 5 is a perspective view of the full size clay styling model shown in FIGS. 1 and 3, showing the clay model at the 100% completion stage with the reference templates being made therefrom for the entire body.
Figure 6:
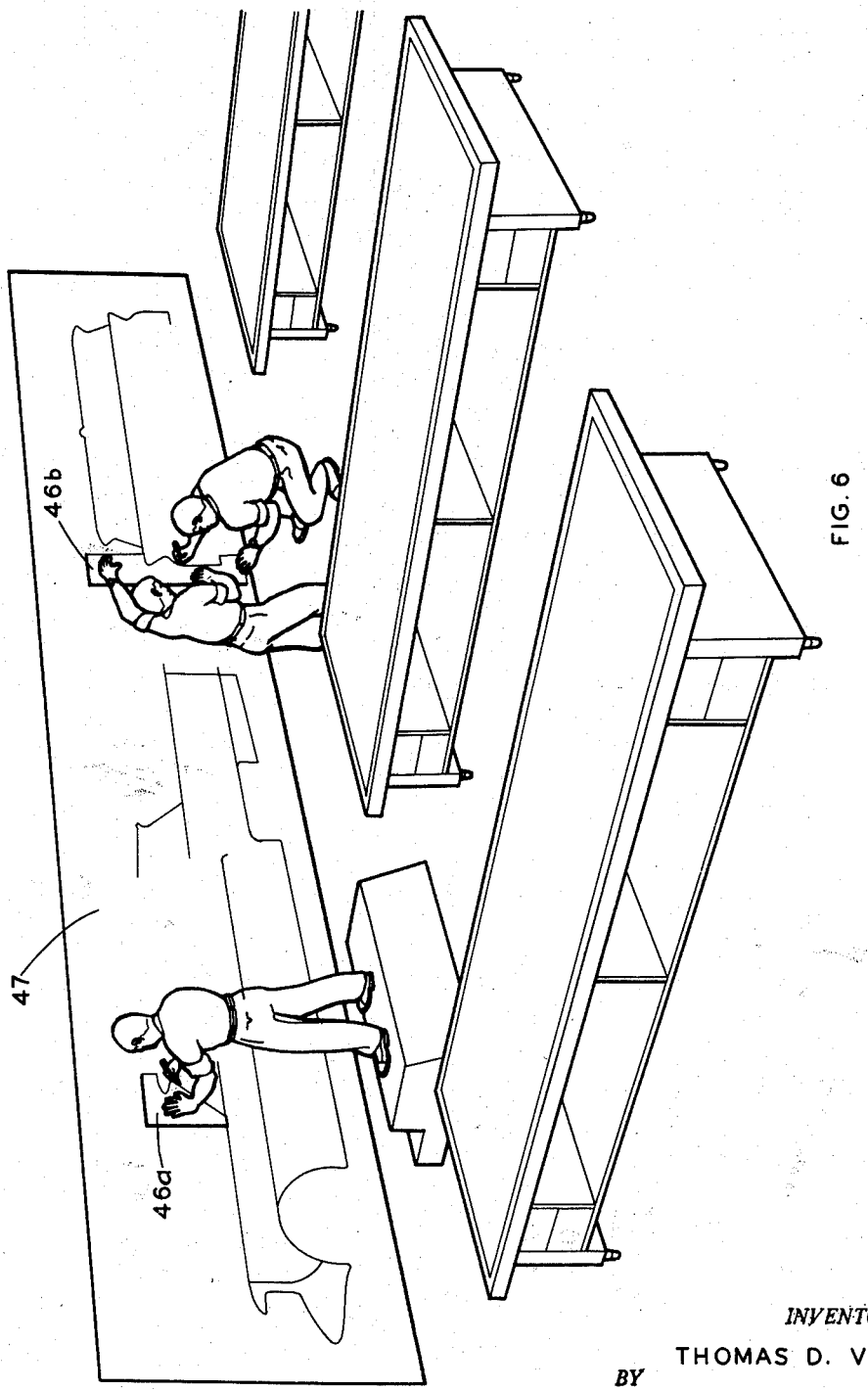
FIG. 6 is a fragmentary perspective view of a body engineering department and showing the starting of the structure development drawings with the reference templates made from the model of FIG. 5.

During the time that the body surface development department has been making the insert substructures the body styling department has been finishing the clay styling model to the point where the styling is 100% complete. At this point the car body clay model would be in condition for the making of reference templates therefrom as shown in FIG. 5. In FIG. 5 the finished clay model is indicated by the numeral 10b and the men are making the reference templates as 46 for the entire car body from the finished styling model 10b. These reference templates 46 are then given to the body structures engineering department who then start their phase one of laying out the engineering drawings, as 47, as shown in FIG. 6. The numerals 46a and 46b merely indicate different reference templates.

Figure 7:
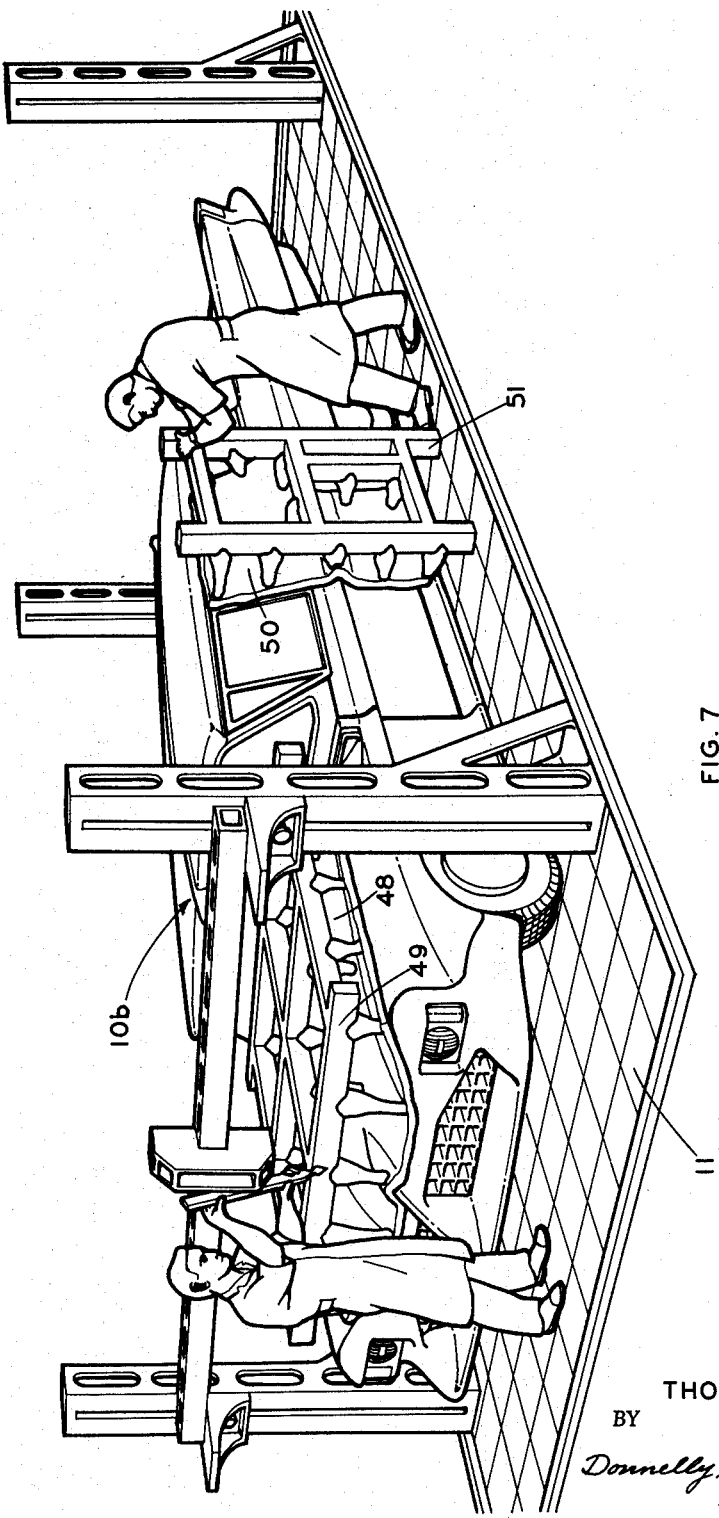
FIG. 7 is a perspective view of the full size scale clay styling model shown in FIGS. 1 and 3, showing the clay model at the 100% completion stage, and further showing the procedure of making female molds of each of the outer panels of the automobile body.

When the clay styling model is 100% completed, as indicated by the numeral 10b in FIGS. 5 and 7, the body styling department carries out the fourth phase of their program by making female molds of each panel, as illustrated in FIG. 7. As shown in FIG. 7, the men are making female molds of the hood panel and the left rear door panel, which are indicated by numerals 48 and 50, respectively. The female molds 48 and 50 are suitably supported by the usual frames generally indicated by the numerals 49 and 51, respectively. The female molds 48 and 50 are made from plaster or other suitable materials in the conventional manner. At the time that the female molds are laid up they are made with a run off condition around the peripheries made by the scored lines on the clay model 10b so as to provide the desired panel periphery on the mold.

Figure 8:
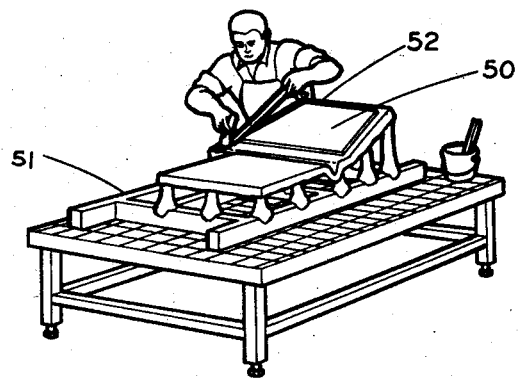
FIG. 8 is a perspective view of a female mold of a door panel made from the clay model shown in FIG. 7, and showing the fabrication of the adjustable peripheral highline and character line pattern or contour member of the door panel.
Figure 9:
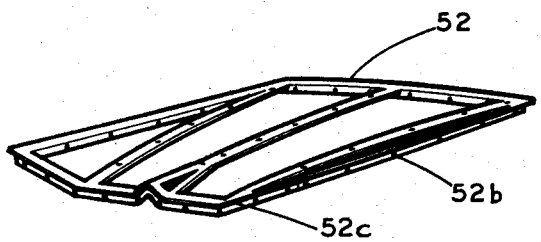
FIG. 9 is a perspective view of a hood peripheral, highline and character line band formed in accordance with the procedure shown in FIG. 8.

After the female molds are completed the body surface development department then fabricates the plastic, or suitable material, band periphery pattern as indicated by the numeral 52 in FIG. 8. FIG. 8 shows the man applying plastic tape-like material around the periphery of the door female mold 50. The plastic tape-like material would also be laid along any character or high line as shown in FIG. 9. The tape is laid around the scored periphery lines formed in the female mold, and preferably, the tape is disposed so as to extend outwardly slightly beyond the scored lines to provide excess material for run-off and matching purposes. The plastic tape could be made up of materials such as fiberglass cloth impregnated with a suitable resin such as an epoxy type. It will be seen that the plastic tape will form a flexible or adjustable peripheral highline and character line partial band of the panel.

Figure 10:
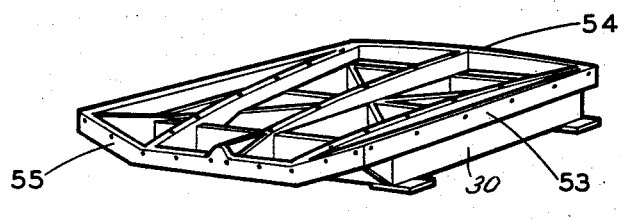
FIG. 10 is a perspective view of the hood sub-structure showing it in a fabricated condition with the peripheral band of FIG. 9 removed.
Figure 13:
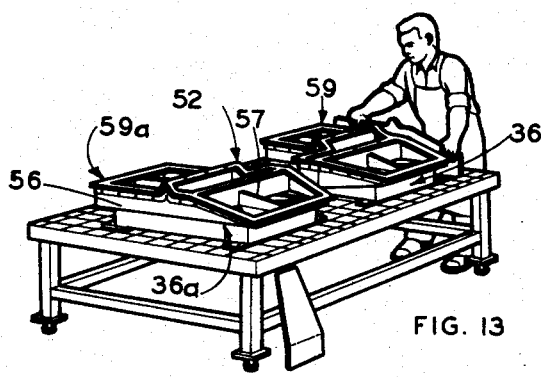
FIG. 13 shows two intermediate door panel patterns being balanced symmetrically to tooling tolerances for periphery, contour or surface characteristics.

After the peripheral pattern 52 (FIG. 9) has been formed, the preformed insert substructure for this particular band is then releasably secured to the pattern 52 by any suitable means. As shown in FIG. 10, hood contour pieces as 53, 54 and 55 have been mounted on an insert substructure 30. These contour pieces are built up on the insert substructure from information obtained from the female mold and the styling clay model. The contour pieces are made from the same materials as the insert structures and are secured thereto by screws, adhesive and the like. The peripheral band 52 is then affixed on top of the contoured pieces as 53, 54 and 55 by screws as 52a which pass through the elongated slots 52b which are formed in the integral supporting flange 52c. The insert substructure 30 and the other contour support structure may be releasably secured to the peripheral band 52 while it is resting on the female mold 48. The numeral 52 has been used to indicate all panel bands. FIG. 13 shows the insert substructures 36 and 36a and the contour pieces 56 and 57 which would be used to support the peripheral door bands 52.

Figure 12:
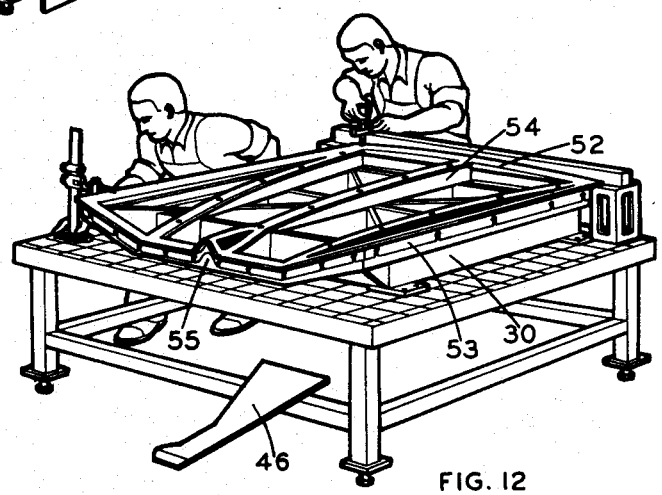
FIG. 12 shows the intermediate hood pattern of FIG. 11 located on a surface plate where the adjustable band is being balanced symmetrically to tooling tolerance for periphery, highline and contour or surface characteristics.
Figure 11:
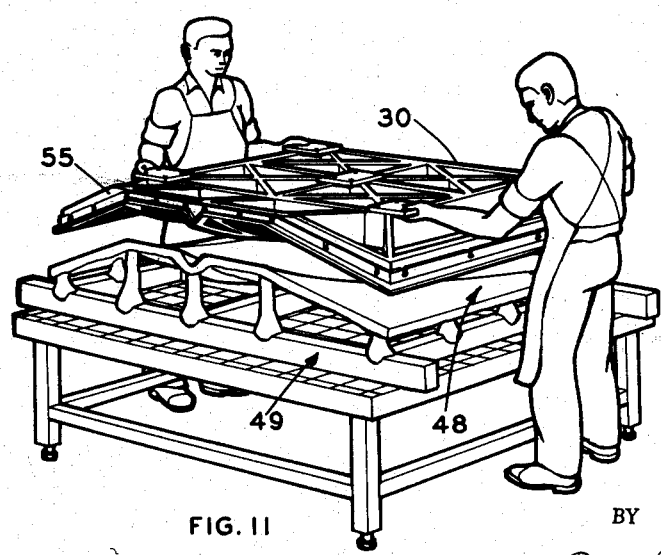
FIG. 11 is a perspective view of the assembled intermediate pattern structure of FIGS. 9 and 10, showing it being removed from its mating female mold for checking purposes prior to balancing.

FIGS. 12 and 13 illustrate the next step or phase 4 in the body surface development. After the substructures have been affixed to the peripheral patterns 52 the completed pattern structure is then taken off the female mold and located on surface plates for periphery, contour and character line adjustment of the bands. In this step, the key panels, namely, the hood, the roof, the windshield, the back light and the rear deck lid panels are symmetrically balanced, that is, making one side symmetrical to the other side in three planes. This is important and can be carried out in accordance with engineering information which is necessary in aircraft work, or by adjusting the panel to balance without engineering information as in automotive work, which is a novel feature of the invention. However, engineering information could be made available in the automotive industry for this step, but it is not necessary in this invention when making a complete body as aforedescribed. For example, in the making of an individual panel, rather than a complete body, engineering information would have to be provided. By engineering information is meant, mold loft or body draft data, product drawings, templates, and like information. If the balance of a panel is to be adjusted without engineering information, then one side can be adjusted as desired and wrap templates taken off this half and then these templates can be reversed and used to make the other side symmetrical, because the flexible plastic peripheral band edge can be raised or lowered or adjusted inwardly or outwardly, as desired so as to change the surface or periphery and bring it into symmetrical balance.

Figure 14:
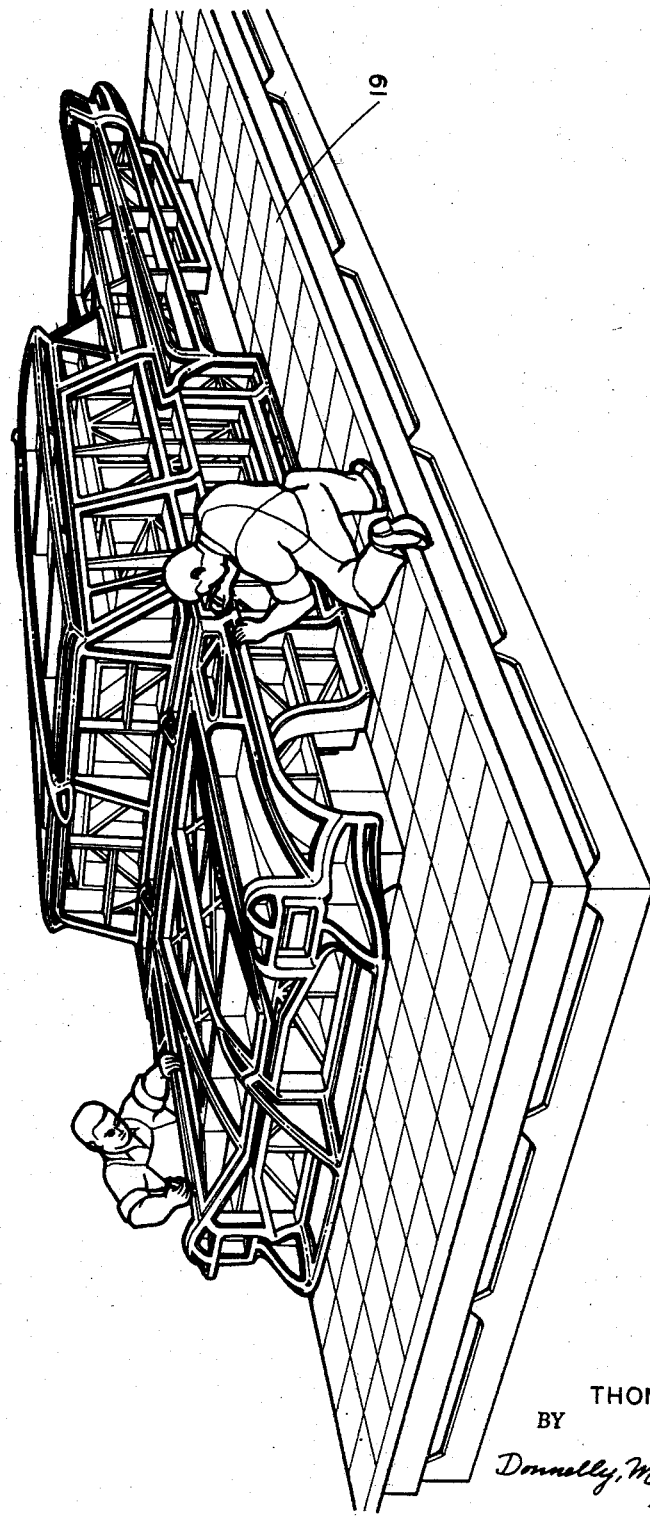
FIG. 14 illustrates all outer body panel intermediate patterns mounted on the supporting cube structure of FIG. 2 for checking the periphery clearance between each panel and for matching or flushing the contour or surface bands of each panel with the adjacent panels.

After the key panels have been balanced with or without engineering information, they are put onto the basic supporting cube structure as shown in FIG. 14 for the phase 5 of the invention, or the periphery clearance check and contour or surface matching. The mating surfaces of the other panels are matched to the key panels. While the panel inserts are mounted as shown in FIG. 14 they can be provided with the proper or desired periphery clearances by adjusting in any suitable manner as adding or subtracting heighth and side movement with the elongated slots 52b in the plastic flange 52c from the edge of the periphery of each of the patterns. Clearances, position, opening and closing features of hinging panels are established at this time.

Figure 16:
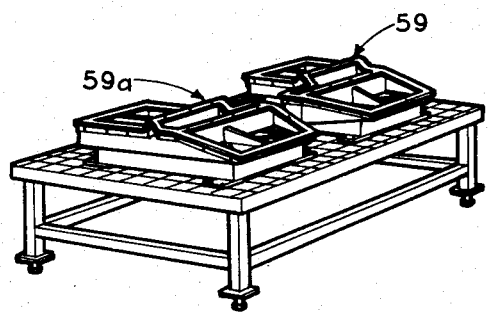
FIG. 16 is a perspective view of two intermediate door panel patterns located on a surface plate for recording of the periphery, highline and character line dimensions of the same after the matching phase.
Figure 15:
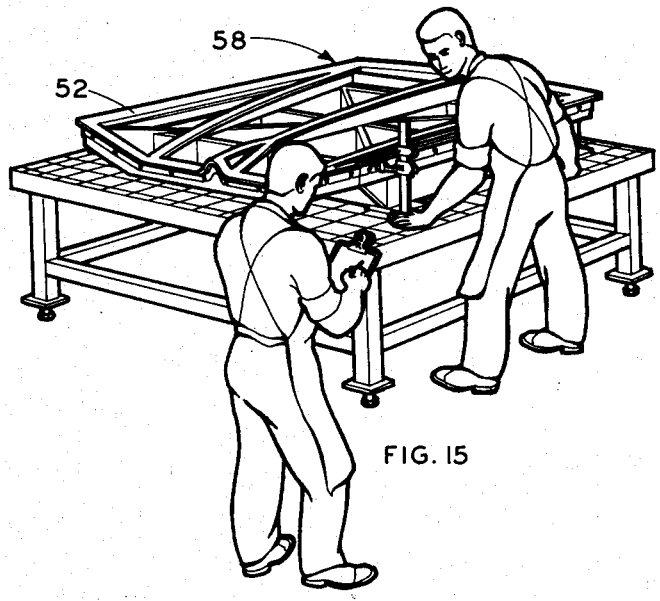
FIG. 15 is a perspective view of the intermediate hood panel pattern located on a surface plate and showing the recording of the periphery, highline and character line dimensions after the matching phase.

After the complete patterns minus the normal surfaces have been checked and provided with the desired clearance they are removed from the basic supporting cube and all pertinent dimensions are taken off and recorded. As shown in FIG. 15, the pertinent dimensions of the balanced hood pattern 58 are being recorded, and in FIG. 16 the balanced door patterns 59 and 59a are located on a surface plate awaiting recording of their pertinent dimensions. These dimensions are very valuable to the engineers developing the inner structure of the automobile because it is well known from experience that the inner panels of a car body generally mate only on the periphery of the outer panels. It will be understood, that inner panels of an automobile or like vehicle could be modeled by styling in clay or similar material and that they could be reproduced by the procedures of this invention. Examples in the automotive field of this feature would be the wheel house, door inner panels, floor pan, and so forth. In this way, the inner construction of an automobile could be expedited, thus offering more lead time for manufacturing tool construction. In the past, in accordance with the prior art modeling procedures, the inner panels of an automobile have not been made in accordance with the principles of the present invention. The aforementioned periphery clearance check and contour matching can be termed the fifth phase in the body surface development procedure, and the recording of the pertinent dimensions can be termed the sixth phase in the body surface development procedure.

Figure 17:
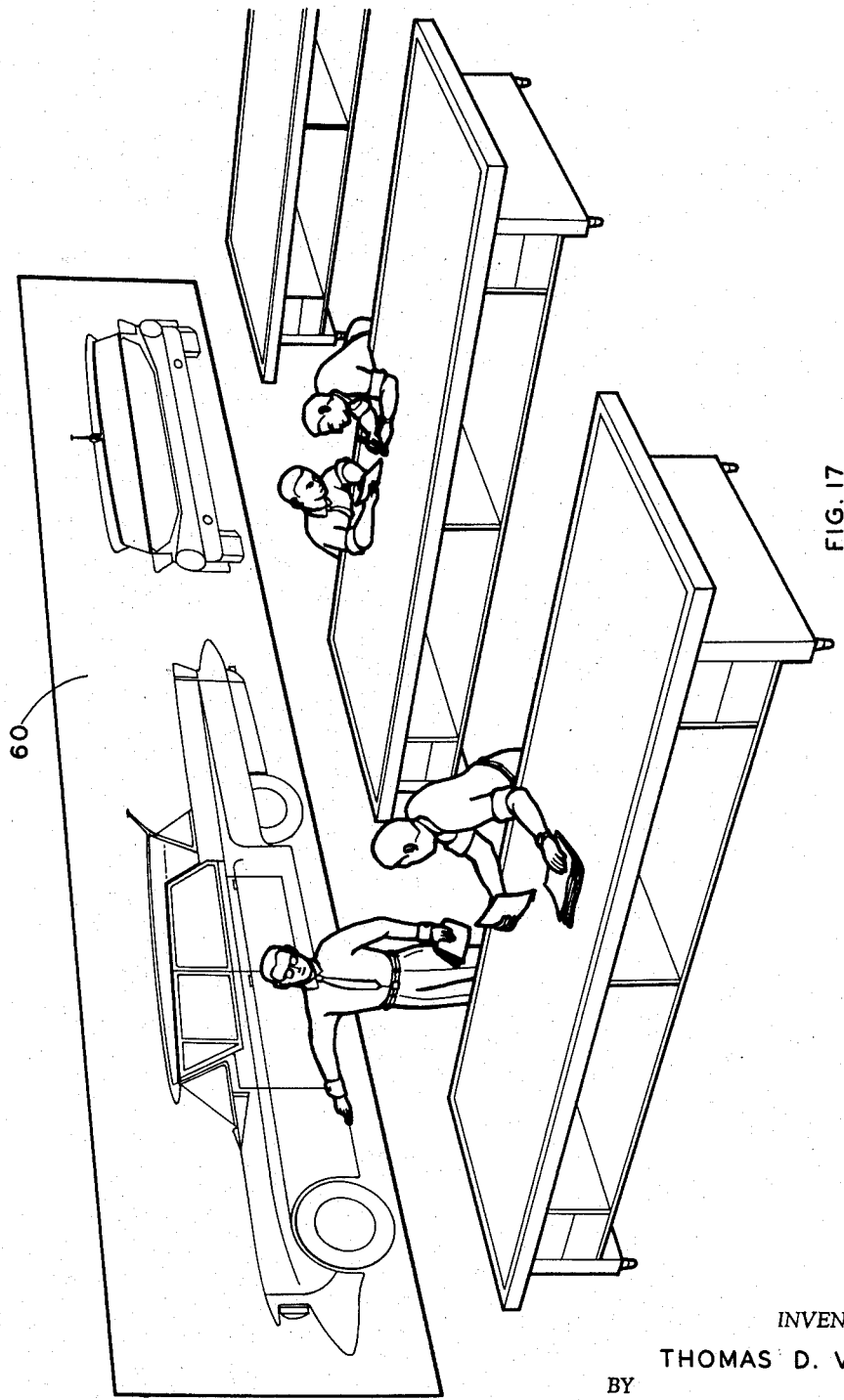
FIG. 17 is a fragmentary perspective view similar to that of FIG. 6 showing the body engineering department establishing the dimensions of the panel peripheries on the body development drawings from the dimensions obtained by the procedure shown in FIGS. 15 and 16.

As shown in FIG. 17, the information logged or recorded on the panel peripheries is given to the body structures engineering department which then establishes accurately the final engineering panel peripheries for their engineering drawings, as 60. This is phase two in the body structure engineering development work.

Figure 18:
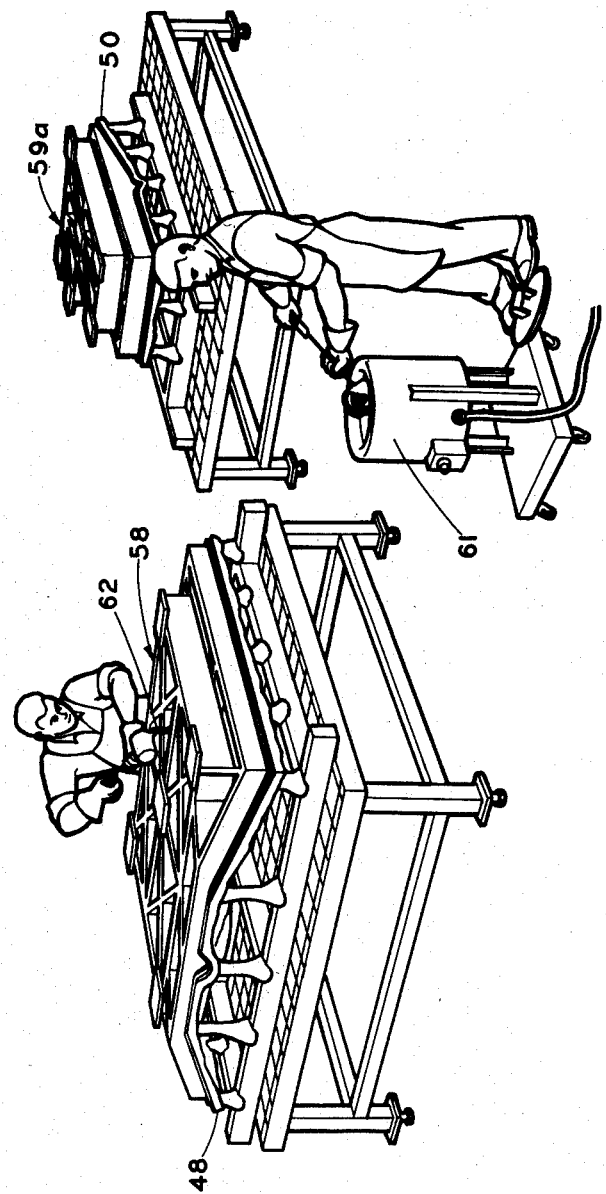
FIG. 18 is a pictorial view of the procedures showing the filling of the panel patterns with a pliable dental wax or plastic type material to fill in the normal surface thereof.

FIG. 18 illustrates the next step or phase number seven in the body surface development procedure. As shown in FIG. 18, the male patterns, as 58 and 59a, are again mounted on their respective female molds 48 and 50 for the molding of the male surfaces or the normal surface areas of the patterns. That is, for filling the normal surfaces of the panel between the bands of plastic forming the peripheral plastic pattern. The material used for this purpose may be any suitable pliable material, as for example, dental wax, a suitable plastic or the like. In FIG. 18, the numeral 61 indicates a heating device for heating the pliable molding material and 62 indicates the molding material being poured down through the panel substructure from the rear side thereof and onto the surface of the styling female mold of FIG. 7. A backup material such as perforated plastic material or expanded metal is employed near the surface of the male pattern to retain the pliable molding material in its proper position. This backup material is indicated by the numeral 69 in FIG. 29.

Figure 20:
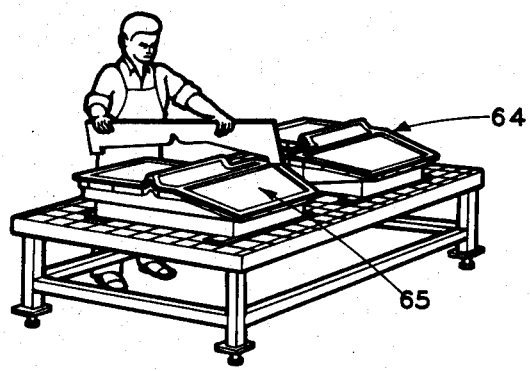
FIG. 20 is a perspective view of the illustrative door panel, with the pliable dental wax or plastic type material on the normal surface being worked off with the use of reference templates.
Figure 19:
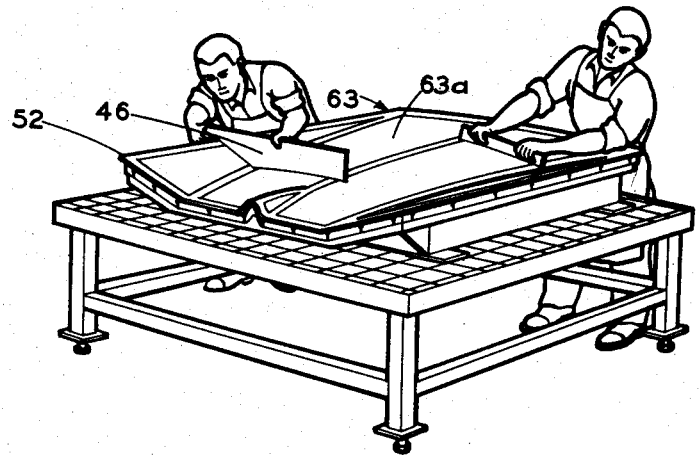
FIG. 19 is a perspective view of the illustrative hood panel, with the pliable dental wax or plastic type material on the normal surface being worked off with the use of reference templates.

The next step in the body surface development procedure is phase eight which is illustrated in FIGS. 19 and 20. In this step the surface of the pattern is worked in conjunction with the contour of the reference templates and character lines which conform with the periphery contour. The normal surfaces and the reference templates are simultaneously developed to suit established styling concepts from the clay. The splining of the pliable material of this invention greatly expedites the forming of the finished contoured surfaces as compared to the laborious and time consuming splining of wood that is carried out on conventional mahogany master models. In addition unique surfaces or major or minor model changes can also be easily incorporated with this invention. As shown in FIG. 19, the intermediate male pattern with the normal surface is indicated by the numeral 63, for the hood panel, the surface being worked is indicated by the numeral 63a and the template being used is indicated by the numeral 46. FIG. 20 shows the rear car door intermediate patterns 64 and 65 with their normal surfaces being worked.

Figure 22:
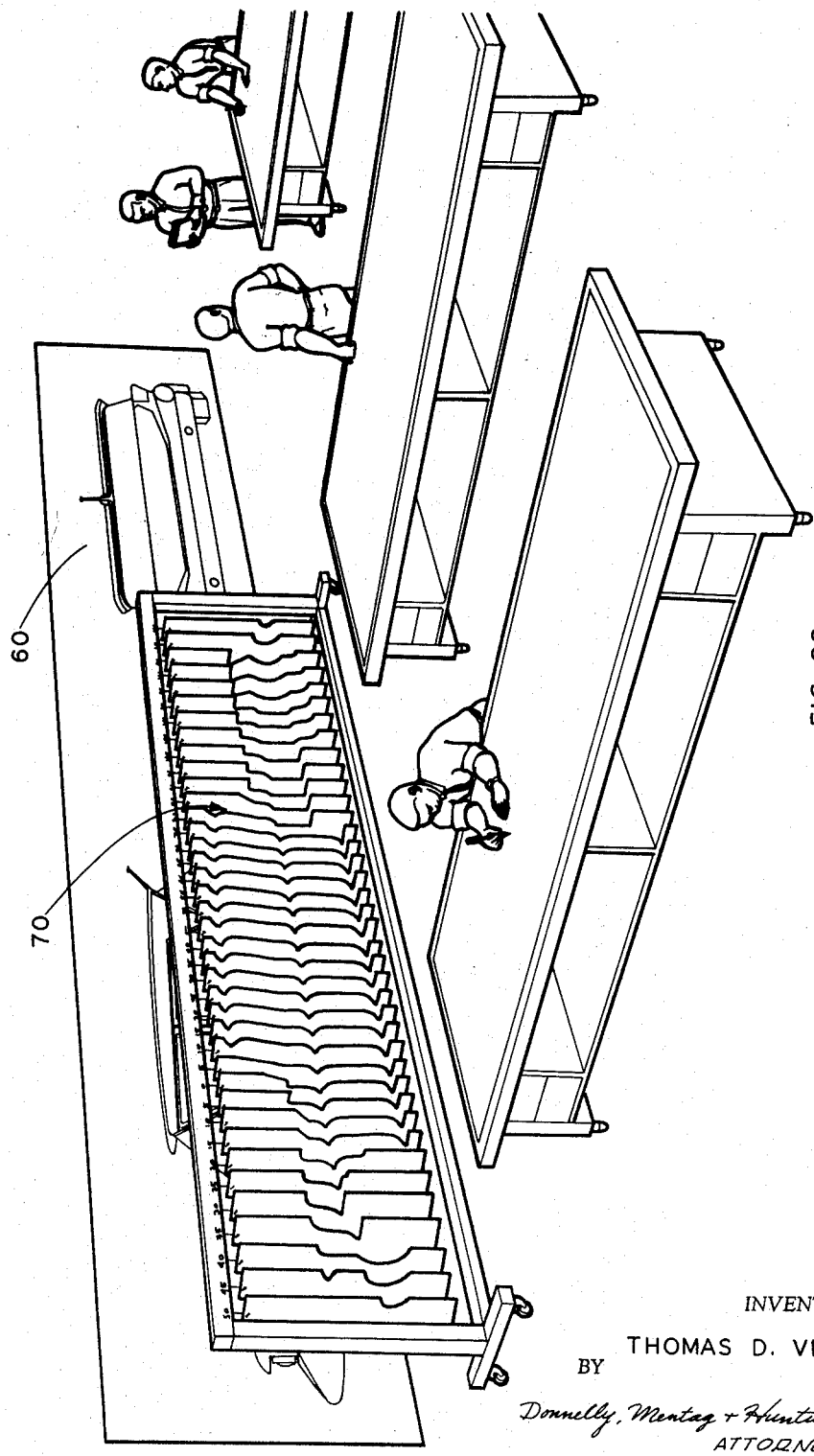
FIG. 22 is a view similar to that of FIG. 6 and showing the release of reference templates which after approval become master templates to layout the surface lines on the master draft by the body structure engineering department for the completion of the body structure drawings, these templates is checked to the approved assembly of panel patterns shown in FIG. 21.

FIG. 21 shows the various intermediate male panel patterns again mounted on the basic supporting cube structure for phase nine of the body surface development. After the entire assembly of intermediate male patterns have been mounted on the basic supporting cube the management and stylists can make final changes and check the highlighting, giving the design a final approval. Reference templates can then be inspected from the completed intermediate male pattern and released to the other departments as master templates. As shown in FIG. 22, the body structures engineering department can now complete phase three of their procedure with this release of master templates 70. The engineering drawings 60 can be finally checked and released to the other departments for manufacturing purposes. FIG. 21 shows the final approved intermediate male patterns just before removal for the making of the female master models.

Figure 24:
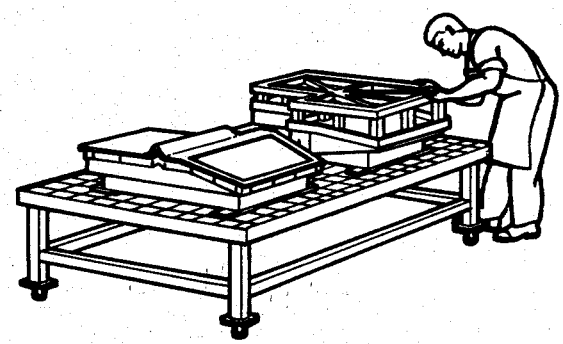
FIG. 24 is a perspective view of the illustrative door panels male intermediate patterns or models, showing the procedure for making the female master models.
Figure 23:
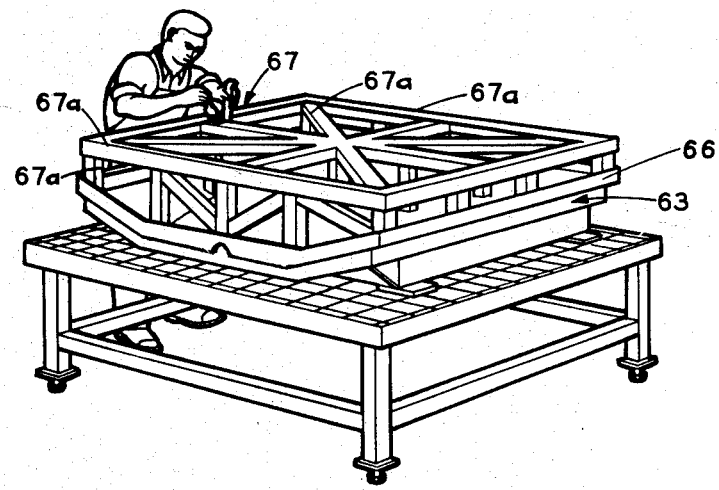
FIG. 23 is a perspective view of the illustrative hood panel male intermediate pattern or model, showing the procedure for making the female master model.

Phase 10 of this invention is the making of the master female model from the intermediate male pattern model which was completed in phase nine. FIGS. 23 and 24 illustrate the procedure for making the female master model from which duplicate male master models can be produced. This feature of the invention offers a reproduction process for making master male models at a point, timewise, much sooner than is possible by means of the prior art modeling procedures.

FIG. 23 is a perspective view of the hood intermediate pattern or model 63, showing the procedure for making the female master model. The reference numeral 66 generally indicates the master female model in the process of being fabricated and the reference numeral 67 generally indicates the supporting back-up structure of the female model. The master female model 66 is formed against the intermediate male pattern 63 in a conventional manner. The material used in producing the model 66 may be any suitable conventional plastic like material such as an epoxy type resin material. The backup supporting structure 67 is also made in any suitable conventional manner and from any suitable conventional material such as plastic tubing 67a. FIG. 24 is a perspective view of the illustrative door intermediate male patterns or models, showing the procedure for making the female master models thereof in accordance with the same procedure as explained for the hood panel of FIG. 23.

Figure 25:
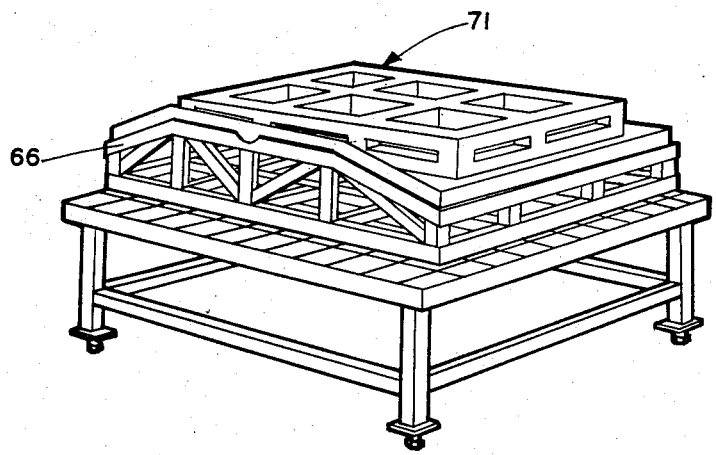
FIG. 25 is a perspective view of the procedure of making a master male duplication from the master female model of a hood panel.

FIG. 25 is a perspective view of phase 11 or the procedure for making master male duplications from the master female model of a hood panel. In this figure the numeral 71 designates a male master model duplication being made from the master female model 66. The male master model duplication 71 is made from the same materials and general construction as the master female model as more fully described hereinbefore. Any suitable conventional method may be followed in carrying out this duplication step.

Figure 26:
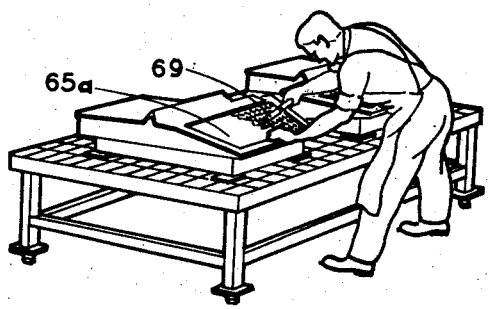
FIG. 26 is a perspective view of the illustrative door panels male intermediate, patterns or models, showing the removal of the pliable intermediate surface coating or material in preparation for conversion to a permanent pattern or for return to the styling department for subsequent major or minor model change-overs.

FIG. 26 is a perspective view of phase 12 of the removal of the pliable material from the backup material 69 of the inner normal surfaces 65a of the intermediate male door patterns used for the complete body in preparation for their return to the styling department. All other body intermediate patterns can be treated in like manner. This allows the stylist to utilize all sub-structures and salvage panels over again immediately in his next styling program. With this innovation the stylist has a basic supporting cube structure with all adjusted panels available with clearances and opening features awaiting re-styling. The normal surfaces can be filled with clay, wax or the like, as desired, to suit the new contour.

Figure 27:
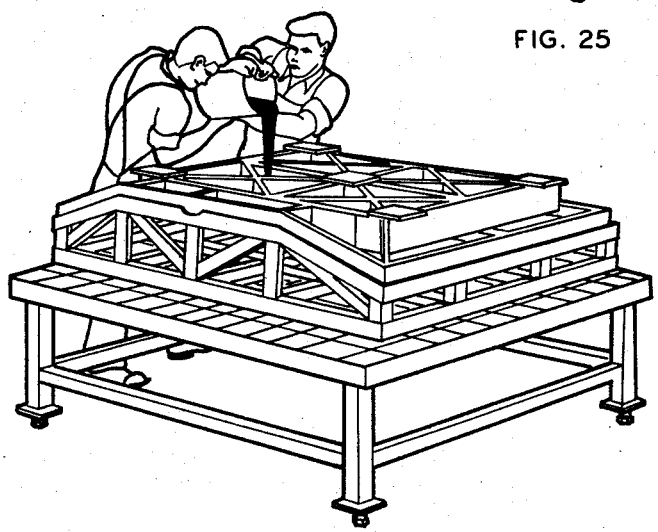
FIG. 27 is a perspective view of the illustrative hood panel male intermediate pattern or model where the pliable intermediate surface coating has been removed with the male model being mounted on the female master model and showing the application of the permanent type material.

FIGS. 26 and 27 illustrate the alternate phase 11a of the invention which is especially adapted for use by organizations making a minor model changeover and or after all major model change-overs have been exhausted wherein the original set of intermediate male patterns can be filled in on their normal surfaces with a permanent plastic type material to provide a single set of checked out master male models. FIG. 26 illustrates the removal of the pliable material from the inner normal surfaces of the intermediate male pattern, while FIG. 27 illustrates the application of the permanent type plastic-like material in the inner normal surfaces. It will be understood that this set of master male models would be made completely of plastic-tyep material for dimensional stability and other considerations.

FIG. 28 illustrates phase 13 of the body surface development which comprises the assembling of the various male master models, made by either phase 11 or alternate phase 11a, on the basic supporting cube structure to provide a finished set of master male models for die manufacturing and subsequent tooling.

It will be understood, that the normal surfaces of the intermediate male patterns may be formed by other methods than by inverting the peripheral pattern and pouring the pliable material down against the female mold. If desired, the space inside of the peripheral pattern could be filled up to a point adjacent the surface of the plastic strip 52 with a suitable filler material and then the surface may be completed by applying a suitable pliable material and working it to the desired contour with the help of templates. A suitable method of completing the surface of the male pattern in the last described manner is set forth in detail in my co-pending United States application, Serial Number 580,283, filed April 24, 1956 and now Patent Number 2,887,726, and entitled "A Method of Making Plastic Models." The above application also describes the steps for making a plastic master female mold from the male pattern insert.

Figure 30:
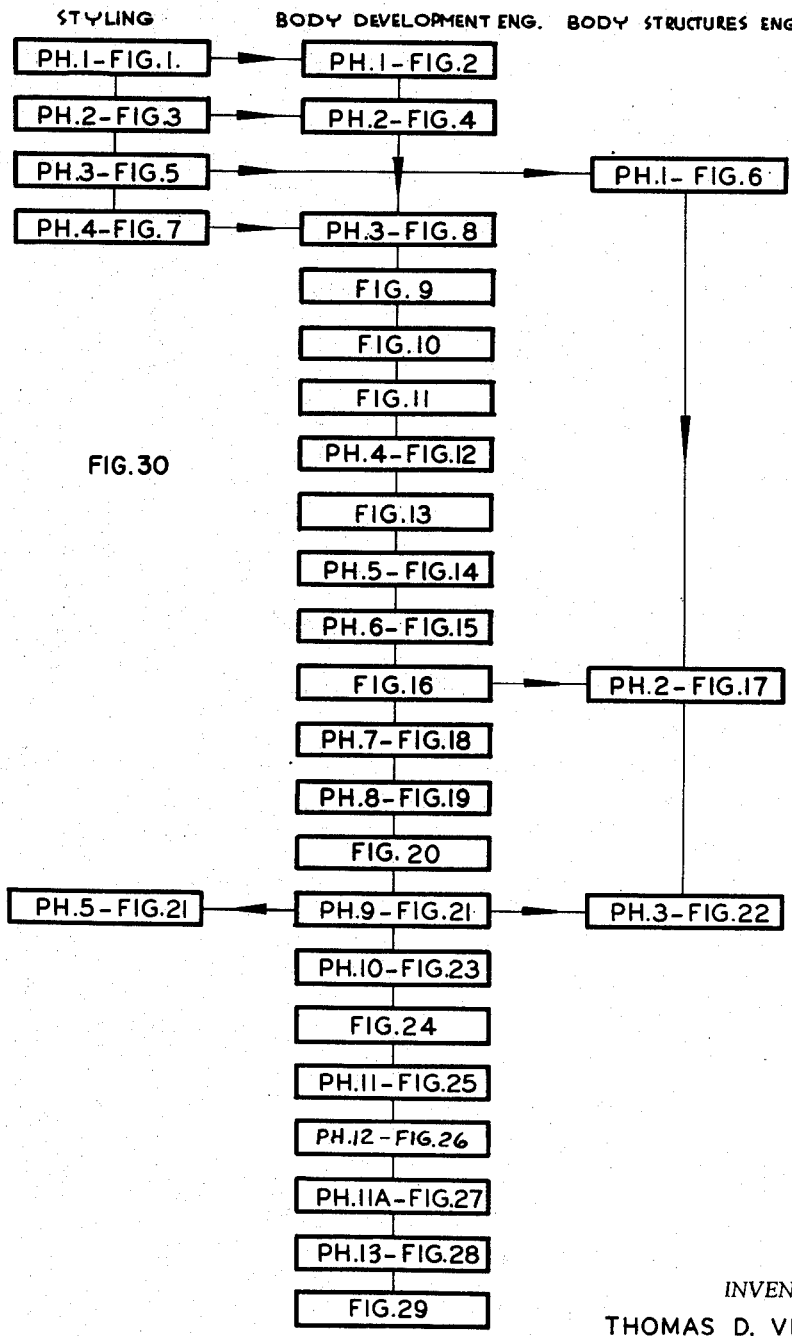
FIG. 30 is a flow sheet of all phases of the invention, showing their comparative phase and figure relationship.

FIG. 30 is a flow sheet of all phases of the invention, in their proper sequence illustrated by phase and figure number. It is submitted that this flow sheet is self explanatory in view of the prior description given hereinbefore of each of the various phases and figures.

It will be understood, that although the invention has been illustrated by a hood and door panel series of illustrations, all other panels would be fabricated in a like manner.

While it will be apparent that the illustrative embodiments of the invention disclosed are well calculated to fulfill the objects above stated, it will be appreciated that the invention is susceptible to modification, variation and change without departing from the proper scope or fair meaning of the subjoined claims.

What I claim is:

1. In the art of body development and the making of master models thereof, the method comprising the steps of, making a styling dummy with lines marked thereon to show the peripheries of the mating panel parts which form the entire body; making a supporting cube and insert sub-structure in accordance with the basic form of the styling dummy during the making of the same for retaining the later formed male models and patterns of said parts in their relative positions; making a female mold of each of the parts of the body from the styling dummy; fabricating a contoured male peripheral pattern of each part of the body from the respective female molds and which includes the highline and character lines of each part; mounting the male peripheral pattern of each part on a unit of said insert sub-structure; balancing the male peripheral patterns to the desired final shape; mounting the balanced male peripheral patterns on the supporting cube structure and adjusting the same for panel clearances, position, opening and closing characteristics, and matching the contours of the assembled male peripheral patterns which form the complete body; removing the male peripheral patterns from the supporting cube structure and measuring and recording all pertinent dimensions thereof to establish engineering information; filling in the normal surfaces of the peripheral patterns with a pliable material to complete the surface of each peripheral pattern and form an intermediate master male model; mounting the intermediate master male models on the cube supporting structure for highlighting of the complete body model; making a master female model from each of said intermediate master male models; and, making a final master male model from each of said master female models.

2. In the art of body development and the making of master models thereof, the method comprising the steps of, making a styling dummy with lines marked thereon to show the peripheries of the mating panel parts which form the entire body; making a supporting cube and insert sub-structure in accordance with the basic form of the styling dummy during the making of the same for retaining the later formed male models and patterns of said parts in their relative positions; making a female mold of each of the parts of the body from the styling dummy; fabricating a contoured male peripheral pattern of each part of the body from the respective female molds and which includes the highline and character lines of each part; mounting the male peripheral pattern of each part on a unit of said insert sub-structure; balancing the male peripheral patterns to the desired final shape; mounting the balanced male peripheral patterns on the supporting cube structure and adjusting the same for panel clearances, position, opening and closing characteristics, and matching the contours of the assembled male peripheral patterns which form the complete body; removing the male peripheral patterns from the supporting cube structure and measuring and recording all pertinent dimensions thereof to establish engineering information; filling in the normal surfaces of the peripheral patterns with a pliable material to complete the surface of each peripheral pattern and form an intermediate master male model; mounting the intermediate master male models on the cube supporting structure for highlighting of the complete body model; removing the pliable material from the normal surfaces of each peripheral pattern; and, filling in the normal surfaces of each peripheral pattern with a hardenable material to form a final master male model.

3. In the art of body development and the making of master models thereof, the method comprising the steps of, making a styling dummy with lines marked thereon to show the peripheries of the mating panel parts which form the entire body; making a supporting cube and insert sub-structure in accordance with the basic form of the styling dummy during the making of the same for retaining the later formed male models and patterns of said parts in their relative positions; making a female mold of each of the parts of the body from the styling dummy; fabricating a contoured male peripheral pattern of each part of the body from the respective female molds and which includes the highline and character lines of each part; mounting the male peripheral pattern of each part on a unit of said insert sub-structure; balancing the male peripheral patterns to the desired final shape; mounting the balanced male peripheral patterns on the supporting cube structure and adjusting the same for panel clearances, position, opening and closing characteristics, and matching the contours of the assembled male peripheral patterns which form the complete body; removing the male peripheral patterns from the supporting cube structure and measuring and recording all pertinent dimensions thereof to establish engineering information; and, filling in the normal surfaces of the peripheral patterns with a pliable material to complete the surface of each peripheral pattern and form an intermediate master male model.

4. In the art of model making, the method of making a master male model of a part from a full scale styling model which is formed to substantially the final shape of the desired style, including the steps of making a female mold of said part from the styling model; making a male pattern of said part from said female mold of the periphery, highline, and character lines thereof; fabricating a back-up supporting framework for said male pattern which conforms on one side thereof to said pattern; mounting said pattern on said back-up framework; symmetrically balancing the periphery and contour of the pattern; filling in the normal surfaces of the pattern to the desired final contour to form an intermediate master male model; and then making a female model duplication from said intermediate master male model.

5. The method as defined in claim 4, wherein: the filling in of the normal surfaces of the pattern is carried out by depositing a pliable material therein and working these surfaces in accordance with templates made from engineering information.

6. The method as defined in claim 4, wherein: the filling in of the normal surfaces of the pattern is accomplished by mounting the symmetrically balanced pattern on the female mold and depositing a pliable material against the face of the female mold in said normal surfaces to provide a continuous surfaced intermediate master male model.

7. In the art of model making, the method of making a master male model of a part from a full size scale styling model which is formed to substantially the final shape of the desired style, including the steps of making a female mold of said part from the styling model; making a male pattern of said part from said female mold of the periphery, highline, and character lines thereof; fabricating a back-up supporting framework for said male pattern which conforms on one side thereof to said pattern; mounting said pattern on said back-up framework; symmetrically balancing the periphery and contour of the pattern; filling in the normal surfaces of the pattern to the desired final contour to form an intermediate master male model; making a female model duplication from said intermediate master male model; and then making a final master male model duplication from said master female model.

References Cited in the file of this patent

UNITED STATES PATENTS

| | | |
|---|---|---|
| 1,403,478 | Bingay | Jan. 17, 1922 |
| 1,868,788 | Zinser | July 26, 1932 |
| 2,447,620 | Singleton et al. | Aug. 24, 1948 |
| 2,460,242 | Renaud | Jan. 25, 1949 |
| 2,516,091 | Renaud | July 18, 1950 |
| 2,616,650 | Thompson | Nov. 4, 1952 |
| 2,632,922 | Kish | Mar. 31, 1953 |
| 2,635,290 | Yuhas | Apr. 21, 1953 |
| 2,635,359 | Broscious | Apr. 21, 1953 |
| 2,652,595 | Kish | Sept. 22, 1953 |
| 2,682,111 | Kish | June 29, 1954 |
| 2,715,280 | Kish | Aug. 16, 1955 |
| 2,750,632 | Kish | June 19, 1956 |
| 2,856,637 | Daniel | Oct. 21, 1958 |
| 2,887,726 | Vertin | May 26, 1959 |